US00RE46198E

(19) United States
(12) Reissued Patent
Sato et al.

(10) Patent Number: US RE46,198 E
(45) Date of Reissued Patent: Nov. 8, 2016

(54) VEHICLE BODY STRUCTURE

(71) Applicant: HONDA MOTOR CO., LTD., Tokyo (JP)

(72) Inventors: Yoshihiko Sato, Wako (JP); Masaaki Ukita, Wako (JP); Yoshiyuki Toba, Wako (JP)

(73) Assignee: HONDA MOTOR CO., LTD., Tokyo (JP)

(21) Appl. No.: 14/709,903

(22) Filed: May 12, 2015

Related U.S. Patent Documents

Reissue of:
(64) Patent No.: 8,439,430
Issued: May 14, 2013
Appl. No.: 13/075,347
Filed: Mar. 30, 2011

(30) Foreign Application Priority Data

Mar. 31, 2010 (JP) ..... 2010-083409
Apr. 14, 2010 (JP) ..... 2010-093358

(51) Int. Cl.
*B62D 25/20* (2006.01)

(52) U.S. Cl.
CPC ..... *B62D 25/20* (2013.01); *B62D 25/2018* (2013.01)

(58) Field of Classification Search
CPC ..... B62D 25/20; B62D 25/2018
USPC ..... 296/193.07, 204, 187.08, 29, 187.09, 296/193.09, 203.01, 203.02
See application file for complete search history.

(56) References Cited

U.S. PATENT DOCUMENTS 4,898,419 A * 2/1990 Kenmochi et al. ..... 296/204
5,806,918 A * 9/1998 Kanazawa ..... 296/204
6,679,546 B2 * 1/2004 Mishima et al. ..... 296/203.01
6,905,165 B2 * 6/2005 Kawabe et al. ..... 296/193.07
7,025,412 B2 * 4/2006 Nakamura et al. ..... 296/193.07
7,104,595 B2 * 9/2006 Kamura et al. ..... 296/193.07
7,118,167 B2 * 10/2006 Nakamura et al. ..... 296/193.07
7,204,547 B2 * 4/2007 Okana et al. ..... 296/204
7,469,957 B1 * 12/2008 Boettcher ..... 296/193.07

(Continued)

FOREIGN PATENT DOCUMENTS

JP 56-152746 11/1981
JP 59-145458 9/1984

(Continued)

OTHER PUBLICATIONS

Chinese Office action dated Mar. 26, 2013, 6 pages.

*Primary Examiner* — Joseph Kaufman
(74) *Attorney, Agent, or Firm* — Rankin, Hill & Clark LLP

(57) ABSTRACT

In a vehicle body structure, a frontal crash performance is improved by establishing a transmission path of a frontal crash load by a floor frame (28) without increasing the weight of the vehicle body, manufacturing cost or the number of welding spots. The floor frame (28) is attached to a lower surface of a floor panel (12), and extends from a rear end of a front side frame (20) from a longitudinally intermediate part of the floor panel. A rear part of the floor panel is formed with a side bead (34) extending in a fore and aft direction in alignment with the floor frame. The rear end of the floor frame is connected to the front end of the side bead via a slope section (32) of the floor panel, and the rear end of the side bead is connected to a middle cross member (18) extending laterally along the rear edge of the floor panel.

18 Claims, 5 Drawing Sheets

(56) References Cited

U.S. PATENT DOCUMENTS

| | | | | |
|---|---|---|---|---|
| 7,500,714 | B2 * | 3/2009 | Abe et al. | 296/193.07 |
| 7,614,684 | B2 * | 11/2009 | Yasuhara et al. | 296/187.09 |
| 7,637,561 | B2 * | 12/2009 | Egawa et al. | 296/193.07 |
| 7,699,385 | B2 * | 4/2010 | Kurata | 296/204 |
| 7,748,774 | B2 * | 7/2010 | Kurata | 296/187.08 |
| 7,784,858 | B2 * | 8/2010 | Abe et al. | 296/203.04 |
| 7,900,998 | B2 * | 3/2011 | Onoda et al. | 296/208 |
| 8,052,204 | B2 * | 11/2011 | Boettcher et al. | 296/193.07 |
| 8,186,735 | B2 * | 5/2012 | Maceri et al. | 296/37.14 |
| 8,276,980 | B2 * | 10/2012 | Boettcher et al. | 296/193.07 |
| 8,292,019 | B2 * | 10/2012 | Hisazumi et al. | 180/274 |
| 8,292,356 | B2 * | 10/2012 | Ishigame et al. | 296/203.01 |
| 8,342,600 | B2 * | 1/2013 | Biersack | 296/193.07 |
| 2006/0061143 | A1 * | 3/2006 | Okana et al. | 296/204 |
| 2006/0066138 | A1 * | 3/2006 | Okana et al. | 296/204 |
| 2010/0066125 | A1 * | 3/2010 | Egawa et al. | 296/193.07 |
| 2010/0078967 | A1 * | 4/2010 | Boettcher | 296/193.07 |
| 2011/0241381 | A1 * | 10/2011 | Sato et al. | 296/193.02 |
| 2011/0272972 | A1 * | 11/2011 | Takayanagi | 296/204 |
| 2012/0212009 | A1 * | 8/2012 | Ishizono et al. | 296/193.07 |
| 2012/0242113 | A1 * | 9/2012 | Yasuhara et al. | 296/193.07 |
| 2012/0256446 | A1 * | 10/2012 | Yasuhara et al. | 296/193.07 |

FOREIGN PATENT DOCUMENTS

| | | |
|---|---|---|
| JP | 4-104779 | 9/1992 |
| JP | 2004-34725 | 2/2004 |
| JP | 2004-237871 | 8/2004 |
| JP | 2007-83868 | 4/2007 |
| JP | 2009-006902 | 1/2009 |
| JP | 2009-006903 | 1/2009 |
| JP | 2009-018725 | 1/2009 |

* cited by examiner

VEHICLE BODY STRUCTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to a vehicle body structure, and in particular to a vehicle body floor structure.

BACKGROUND OF THE INVENTION

In the field of vehicle body structure, it is known to connect a rear end of each front side frame to front ends of a front inside sill and a center frame via an outrigger or the like (See JP 2009-18725A, for instance), and to use a floor frame extending in the fore and aft direction between each front inside sill and a center frame (floor tunnel frame) and having a front end connected to the rear end of a front side frame and a rear end connected to a middle cross member located under the rear seat (See JP 2009-6902A and JP 2009-6903A, for instance).

The floor frames allow the frontal crash load applied to the front side frames to be transmitted to the rear part of the vehicle body via the floor frames in addition to the front inside sills and center frame. By thus increasing the possible paths of the frontal crash load, the transmission of the frontal crash load to the rear part of the vehicle body is performed in a highly efficient manner, and this improves the crash performance of the vehicle body. Furthermore, by welding the floor frames to the floor panel, the stiffness of the floor panel is increased, and this contributes to the NV (noise and vibration) performance of the vehicle body.

However, according to the prior proposal, as the floor frames extend over the entire fore and aft extent of the floor panel, the weight of the vehicle body may undesirably increase. Furthermore, the increased number of welding spots increases the manufacturing cost and reduces the manufacturing efficiency.

Also, in an automotive floor structure, it has been proposed to stamp form dimples defined by a three-dimensionally curved surface in the floor panel with the aim of increasing the stiffness of the floor panel and improving the NV performance of the vehicle body. See (See JP 2004-237871A, for instance).

However, the dimples prevent the floor panel to provide a flat floor surface. In particular, if the dimples extend over large areas and define gradual curves, the carpet placed on the floor surface follows the contour of the dimpled floor surface, and this impairs the comfort of the vehicle occupant. If the floor surface includes slanted areas, the vehicle occupant may be unable to stand of the floor in a stable manner. If the vehicle occupant moves about on the floor, his or her foot may stumble upon floor irregularities, and may experience some discomfort.

Conventionally, such problems were overcome by placing a thick under pad typically made of thick urethane mat or a stiff board under the carpet. But this requires an additional component, and impairs the production efficiency, manufacturing cost and resources saving efforts.

BRIEF SUMMARY OF THE INVENTION

In view of such problems of the prior art, a primary object of the present invention is to provide a vehicle body structure incorporated with a floor frame which is effective in transmitting a frontal crash load to a rear part of the vehicle body without excessively increasing the weight of the vehicle body.

A second object of the present invention is to provide a vehicle body structure incorporated with a floor frame which is effective in transmitting a frontal crash load to a rear part of the vehicle body without excessively increasing the manufacturing cost or impairing the manufacturing efficiency.

A third object of the present invention is to provide a vehicle body structure which provides a flat carpeted floor surface while increasing the stiffness of the floor panel without increasing the weight of the vehicle body.

According to the present invention, such objects can be accomplished by providing a vehicle body structure, comprising: a pair of front side frames each extending in a fore and aft direction; a floor panel having a front end connected to rear ends of the front side frames and extending rearward from the front end thereof in a substantially horizontal direction; a first middle cross member extending laterally in a rear end of the floor panel; a pair of floor frames attached to a lower surface of the floor panel, and each provided with a front end connected to a rear end of the corresponding front side frame and a rear end reaching at least to an intermediate part of the floor panel in the fore and aft direction; and a pair of side beads each having a front end connected to a rear end of the corresponding floor frame and extending rearward therefrom in the fore and aft direction to the first middle cross member.

Each floor frame and corresponding side bead formed in the floor panel jointly establish a transmission path of a frontal crash load that reaches the first middle cross member. The side bead allows the necessary fore and aft length of the floor frame to be reduced, and this in turn reduces the weight of the vehicle body and reduces the number of welding spots.

According to a preferred embodiment of the present invention, a rear part of the floor panel is formed with a foot rest recess recessed from a remaining part of the floor panel, a front end of the foot rest recess including a slope section inclining upward toward a front part of the floor panel, and wherein the side bead extends across the foot rest recess in the fore and aft direction, and has a front end connected to a rear end of the corresponding floor frame at the slope section in linear alignment with each other.

The foot rest recess increases the leg room of the vehicle occupant seated in the rear seat. As the rear end of the floor frame abuts the slope section of the floor panel 12, the slope section increases the mechanical strength of the front part of the side bead. As the floor frame is connected linearly to the side bead at the slope section, the transmission of the frontal crash load from the floor frame to the side bead can be effected in an efficient manner. Preferably, the rear end of the floor frame is overlaid on an outer periphery of the front end of the corresponding side bead by a certain longitudinal length.

Thereby, the floor frame and side bead can be connected to each other with a high mechanical strength, and this allows the frontal crash load from the floor frame to be transmitted to the side bead in an efficient manner. The vehicle body structure of the present invention preferably further comprises a second middle cross member extending laterally immediately in front of the slope section.

The second middle cross member increases the mechanical strength of the slope section, and this enhances the favorable transmission of the frontal crash load from the floor frame to the side bead via the slope section.

According to a preferred embodiment of the present invention, each side bead is formed as a groove having an open end facing upward, and a wire harness is received in the groove defined by the side bead.

Thereby, the side bead can be conveniently utilized as a conduit for receiving the wire harness inside the passenger compartment. Also, by filling the groove defined by the side bead with the wire harness, the carpet placed on the floor surface is enabled to provide a flat floor surface.

According to a certain aspect of the present invention, the vehicle body structure may further comprise a pair of side sills extending in the fore and aft direction along either side edge of the floor panel; a center frame extending in the fore and aft direction along a longitudinal center line of the floor panel; and a pair of connecting members each having a front end connected to a rear end of the corresponding front side frame and a pair of bifurcated rear ends connected to a front end of the corresponding side sill and a front end of the corresponding center frame, respectively; wherein a crotch portion of each connecting member is connected to a front end of the floor frame, and each front side frame and the corresponding floor frame are connected in mutual alignment in the fore and aft direction in plan view via the corresponding connecting member.

Thereby, the frontal crash load applied to each front side frame is transmitted in the fore and aft direction not only by the path defined by the floor frame and side bead of the floor panel, but also by the two other paths defined by the side sill and center frame, respectively. This reduces the requirement of the floor frame and side bead to withstand the frontal crash load, and enables a compact and light weight design of the floor frame. In this case, the floor panel may be provided with a center tunnel section bulging upward and extending in the fore and aft direction in a laterally central position of the floor panel, while the center frames extend along either side end of the center tunnel section.

According to another aspect of the present invention, a part of the floor panel adjoining the center tunnel section includes a sloping section inclining upward toward the center tunnel section and a horizontal terraced section connected to an inboard side of the sloping section, and an outboard side of each center frame comprises a flange overlaid and welded to the terraced section.

As the sloping section is defined by folding lines of the floor panel, the presence of the sloping section increases the stiffness of the adjoining region so that the stiffness of the center frame can be effectively increased.

According to yet another aspect of the present invention, the floor panel includes a downward bulge having a bottom surface recessed from a general surface of the floor panel, and at least one bead projecting upward from a bottom wall of the downward bulge and having a top surface substantially at a same elevation as the general surface.

The downward bulge increases the stiffness of the floor panel. As the bead formed within the downward bulge prevents the sagging or dropping of the carpet into the downward bulge, the need for an additional component such as an under pad for preventing the sagging of the carpet can be eliminated. Furthermore, the bead formed within the downward bulge further increases the stiffness of the floor panel.

If the side bead extends in the fore and aft direction laterally adjacent to the downward bulge, the required stiffness of the floor panel can be achieved without unduly increasing the size of the downward bulge.

Thus, according to the present invention, owing to the cooperation between each floor frame and the corresponding side bead formed in the floor panel, a transmission path of the frontal crash load can be established between the front side frame and first middle cross member. The presence of the side bead allows the length of the floor frame to be reduced, and this allows a corresponding reduction in the vehicle weight and the number of welding spots. Therefore, a high crash performance can be achieved with a minimum cost and without impairing manufacturing efficiency.

Also, by providing a downward bulge and a bead projecting upward from the bottom wall of the downward bulge, the stiffness of the floor panel can be increased without impairing the flatness of the floor surface when the floor panel is covered by a carpet. This is accomplished without adding any extra component and without impairing production efficiency, manufacturing cost and resources saving efforts.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
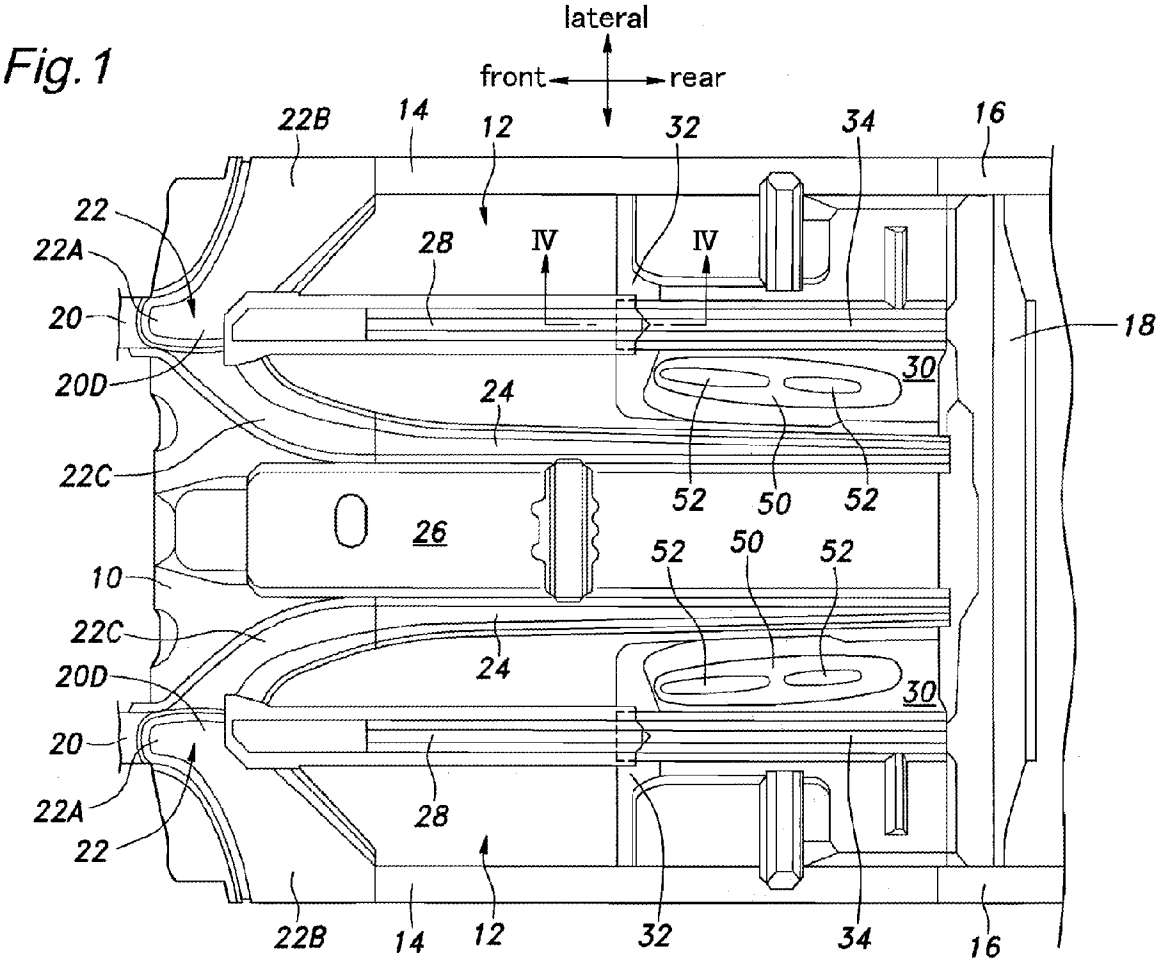
FIG. 1 is a fragmentary bottom view of the floor section of a vehicle body structure embodying the present invention.

Referring to FIGS. 1 to 6, a vehicle body embodying the present invention is essentially formed by stamp forming steel sheet and welding the stamp formed steel sheet components to each other. As this vehicle body structure is in most part symmetric about a central longitudinal line, the following discussion may refer only to one side of the vehicle body structure where appropriate to avoid redundancy of the description.

A front part of the vehicle body includes dashboard panel 10 separating an engine room from a passenger compartment, and a lower end of the dashboard panel 10 is connected to a front end of a horizontally extending floor panel 12 that generally defines the floor of the passenger compartment.

Each side edge of the floor panel 12 is connected to a side sill 14 defining a rectangular closed cross section and extending in the fore and aft direction. The cross section of the side sill 14 is somewhat vertically elongated, and the side edge of the floor panel 12 is welded to a lower end of an inboard side wall of the side will 14. The rear end of each side sill 14 is connected to the front end of a side sill extension 16 also having a rectangular closed cross section.

The rear edge of the floor panel 12 is connected to a first middle cross member 18 having a rectangular closed cross section and extending between the right and left side sill extensions 16. The first middle cross member 18 is also connected to a front edge of a trunk floor panel (which extends horizontally but somewhat higher than the floor panel 12) not shown in the drawings, and defines a kick-up portion between the two floor panels.

From each side end part of the dashboard panel 10 extends a front side frame 20 in the forward direction or to the side of the engine room. The front side frame 20 also has a rectangular closed cross section and has a rear end connected to a corresponding connecting member 22.

Figure 3:
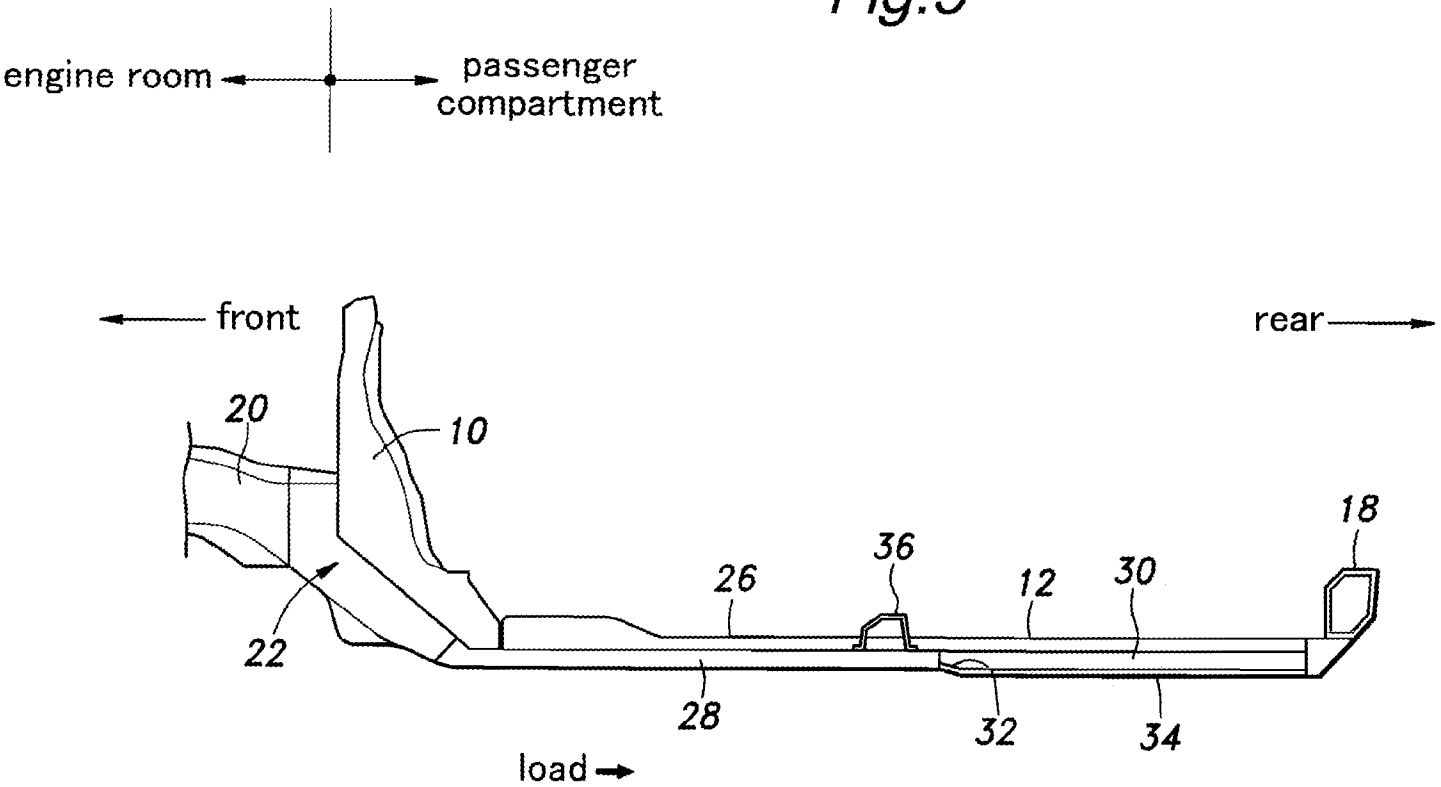
FIG. 3 is a fragmentary sectional side view of the floor section shown in FIG. 1.
Figure 4:
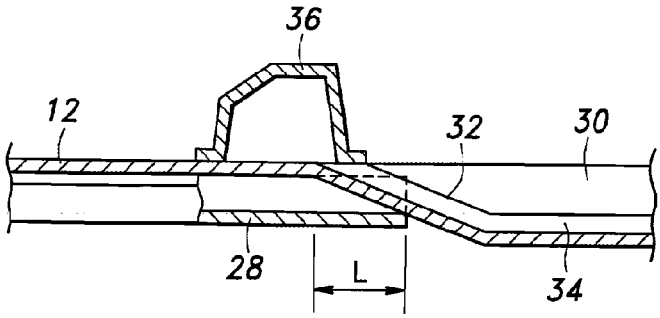
FIG. 4 is an enlarged fragmentary sectional side view taken along line IV-IV of FIG. 1.
Figure 6:
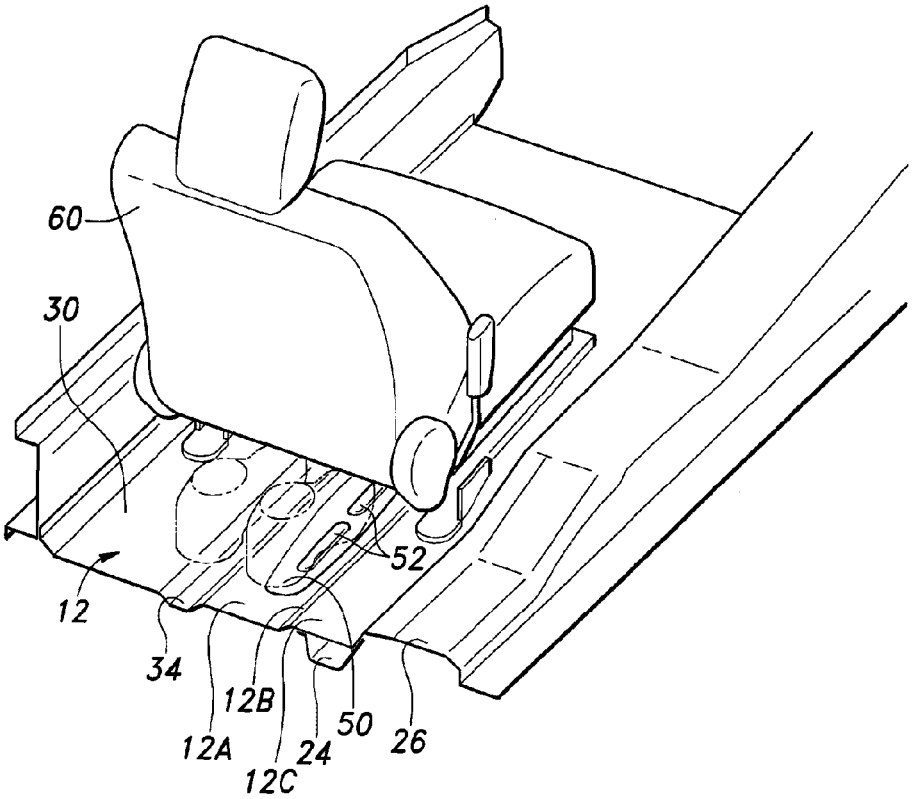
FIG. 6 is a fragmentary perspective rear view of a rear seat mounted on the rear floor section shown in FIG. 1.

The connecting member 22 is provided with a rectangular closed cross section and attached to the front side of the dashboard panel 10 at the front end part thereof as best illustrated in FIG. 3. The connecting member 22 is bifurcated toward the rear part thereof into an outrigger section 22B extending from a connecting section 22A obliquely in the outboard direction and connected to the front end of the corresponding side sill 14 and a center frame extension section 22C extending obliquely from the connecting section 22A in the inboard direction and connected to the front end of a center frame 24 (which will be described hereinafter).

The floor panel 12 is provided with a center tunnel section 26 in a laterally middle part thereof so as to bulge upward and extend in the fore and aft direction, and the rear end of the floor panel 12 is connected to the first middle cross member 18. The center tunnel section 26 may be formed welding a sheet metal component to the floor panel 12 as is the case with the illustrated embodiment, but may also be formed as a part of the floor panel 12 when stamp forming the floor panel 12. Each center frame 24 is provided with a channel cross section, and is attached to the bottom surface of the floor panel 12 adjacent to the corresponding side of the center tunnel section 26 so as to jointly define a rectangular closed cross section. The rear end of the center frame 24 is connected to the first middle cross member 18.

As best illustrated in FIG. 1, a floor frame 28 extends in the fore and aft direction laterally intermediate between each side sill 14 and the corresponding center frame 24, and is attached to the bottom surface of the floor panel 12 so as to jointly define a rectangular closed cross section. The front end of the floor frame 28 is connected to a crotch part 22D between the outrigger section 22B and center frame extension section 22C. Thereby, each floor frame 28 extends in alignment with the corresponding front side frame 20 in the fore and aft direction via the corresponding connecting member 22.

A rear half part of the floor panel 12 is formed with a pair of foot rest recesses 30 on either side of the center tunnel section 26 where a vehicle occupant in the rear seat usually places his or her feet. Each foot rest recess 30 is recessed downward with respect to a main surface 11 (see FIG. 5) of the floor panel 12, and extends in the fore and aft direction from an intermediate point of the floor panel 12 to the rear end of the floor panel 12. In other words, a bottom surface (general surface) 12A of each foot recess 30 is slightly lower than the main surface 11 of the floor panel 12. It should be noted that the foot recesses 30 are optional, and not essential for the present invention or the general surface 12A may be on the same plane as the main surface 11 if desired.

The front end of each foot rest recess 30 is connected to the remaining part of the floor panel 12 via an upward slope section 32. The rear end of each floor frame 28 abuts the upward slope section 32 from the bottom surface thereof as will be described hereinafter.

A channel having an open upper end or a side bead 34 is formed in the floor panel 12 so as to extend across each foot rest recess 30 in a laterally middle part thereof in the fore and aft direction. The side bead 34 protrudes downward from the floor panel 12, and aligns with the floor frame 28 in the fore and aft direction as seen in plan view.

The front end of each side bead 34 is connected to the corresponding floor frame 28 at the slope section 32 of the floor panel 12. The rear end of the side bead 34 is connected or welded to the front wall of the first middle cross member 18.

Each floor frame 28 is provided with a channel cross section slightly larger than the channel cross section of the side bead 34 so that the rear end of the floor frame 28 overlaps with the front end of the side bead 34 over a certain length L (see FIG. 4) extending at least partly (or mostly) over the slope section 32 of the floor panel 12 in the fore and aft direction. The rear end of the floor frame 28 abuts the front or lower surface of the slope section 32, and may be welded thereto.

The part of the bottom wall of each foot rest recess 30 located between the corresponding side bead 34 and center frame 24 is formed with a dimple 50 or an elliptic recess or bulge protruding downward from the floor panel 12. The dimple 50 may be defined by an ellipsoid of revolution or other smooth depression, typically elongated in the fore and aft direction, and is defined by a corresponding three-dimensionally curved surface. The provision of the dimples 50 increases the stiffness of the floor panel 12, and improves the NV performance thereof. However, the shape of the dimples in the illustrated embodiment is purely exemplary, and can be selected as long as it increases the stiffness of the floor panel 12.

A pair of beads 52 each elongated in the fore and aft direction are formed laterally centrally in the bottom wall of each dimple 50 one behind the other. Each bead 52 is provided with a relatively flat top surface 52A at a same elevation as the general surface 12A.

A carpet 42 is laid over the general surface 12A of the floor panel 12. Owing to the presence of the beads 52 in each dimple 50, the carpet 42 is prevented from dropping or sagging into the dimple 52. The beads 52 may act as stepping stones in each dimple 50. It were not for the beads 52, the carpet 42 would follow the contour of the curved inner surface 50A of the dimple 50, and the flatness of the floor surface may be impaired. Therefore, even when the carpet 42 is not provided with unduly high thickness or stiffness, a flat floor surface may be achieved without adding any stiff floor board or carpet liner.

Furthermore, the beads 52 enhance the performance of the dimples 50 in improving the NV performance of the floor panel 12.

Figure 5:
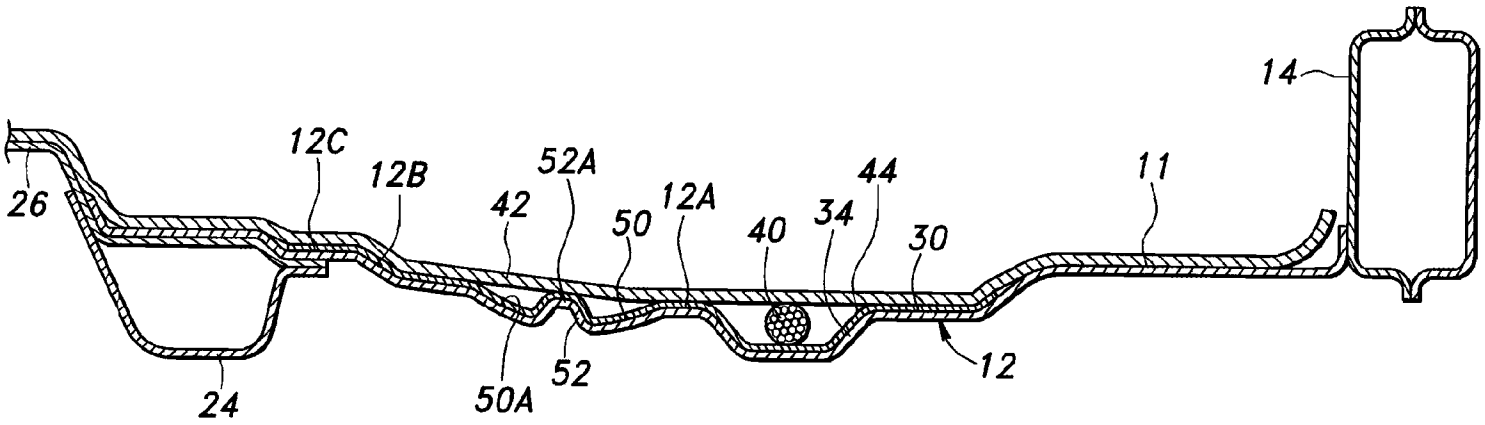
FIG. 5 a fragmentary cross sectional view taken along line V-V of FIG. 1.

As best shown in the cross sectional view of FIG. 5, the part of the floor panel 12 intermediate between the foot rest recess 30 and the center frame 24 includes a sloping section 12B inclined upward in the inboard direction. A horizontally extending terraced section 12C is connected to the inboard side of the sloping section 12B. The terraced section 12C may have a same elevation as the general surface 12A of the floor panel 12. An outboard flange of the center frame 24 is overlaid with the lateral edge of the center tunnel section 26 and the floor panel 12, and are welded to each other.

The sloping section 12B which consists of a bent section of the floor panel 12 contributes to the improvement in the stiffness of the floor panel 12. This allows the necessary lateral width of the dimple 50 to be minimized so that the carpet 42 is made less prone to dropping into the dimple 50.

In the illustrated embodiment, the beads 52 are located well inside each dimple 50, and not adjacent to the periphery thereof so that a stress concentration in the peripheral part of the dimple 50 can be avoided when stamp forming the floor panel 12 including the dimples 50.

Each side bead 34 is located adjacent to the outboard side of the corresponding dimple 50. As the side bead 34 is formed by bulging the floor panel 12 in downward direction, a space defined by the side bead 34 and carpet 42 can be conveniently used for receiving a wire harness 40 therein. The presence of the wire harness 40 in each side bead also contributes to defining a flat floor surface by filling the groove defined by the side bead 34. The presence of the side bead 34 increases the stiffness of the floor panel 12, and this also allows the necessary lateral width of the dimple 50 to be minimized so that the carpet 42 is made less prone to dropping into the dimple 50.

Thus, a relatively flat floor surface can be achieved in spite of the presence of the dimples 50 and side beads 34. If desired, a melt sheet 44 may be attached to the upper surface of a selected area of the floor panel 12 to further enhance the NV performance of the floor panel 12.

Figure 2:
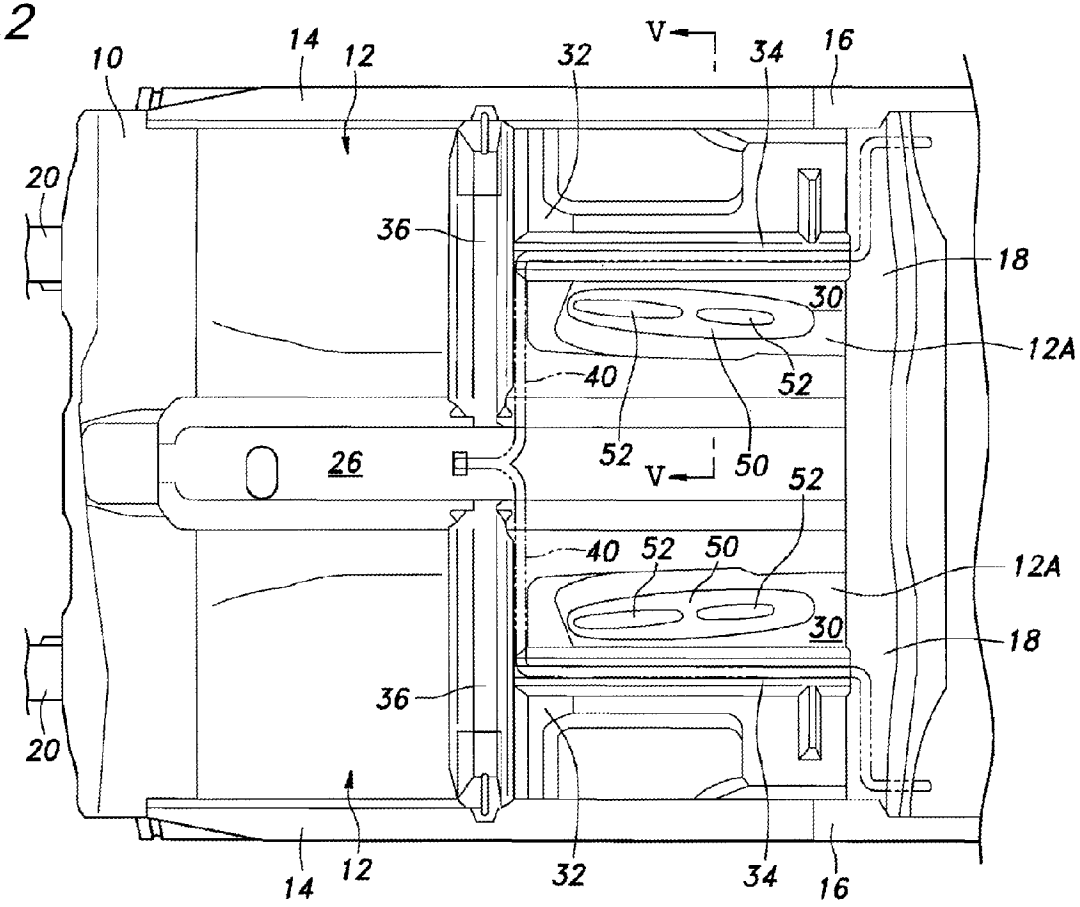
FIG. 2 is a fragmentary plan view of the floor section shown in FIG. 1.

As best illustrated in FIG. 2, a second middle cross member 36 extends laterally from an intermediate part of the center tunnel section 26 to each side sill 14. The second middle cross member 36 is provided with a channel cross section having an open end facing downward, and is welded to the upper surface of the floor panel 12 along side flanges of the second middle cross member 36 so as to jointly define a closed cross section. The second middle cross member 36 is located immediately ahead of the slope section 32.

In this vehicle body structure, the frontal crash load applied to the front side frames 20 is transmitted to the rear part of vehicle via a plurality of paths:

(1) front side frame 20→outrigger section 22B→side sill 14→side sill extension member 16→first middle cross member 18;

(2) front side frame 20→center frame extension section 22C→center frame 24→first middle cross member 18; and (3) front side frame 20→crotch part 22D of the connecting member 22→floor frame 28→side bead 34→first middle cross member 18.

In particular, as best illustrated in FIG. 1, each floor frame 28 aligns with the corresponding front side frame 20 in plan view so that the transmission of the frontal crash load along path (3) can be effected in a favorable and efficient manner without causing any undue bending moment.

The side bead 34 serves as a rear extension of the floor frame 28, and provides a similar effect as rearwardly extending the floor frame 28 in achieving a required crash performance Therefore, the weight of the vehicle body can be reduced owing to the elimination of the need for an extension of the floor frame 28, and the efficiency of the assembly work can be improved owing to the reduction in the number of welding spots.

The frontal crash load applied to each front side frame 20 is transmitted to the rear part of the vehicle body not only via the path defined by the floor frame 28 and side bead 34 but also via the two additional paths defined by the side sill 14 and center frame 24. Therefore, the crash load is distributed between the three transmission paths so that the floor frame 28 can be made more compact and light in weight.

The second middle cross member 36 allows the frontal crash load applied to the floor frame 28 to be distributed between the side sill 14 and center frame 24, and this allows the floor frame 28 to be made more compact and light in weight owing to the reduced strength/stiffness requirements.

In this vehicle body structure, because the rear end of the floor frame 28 abuts and welded to the slope section 32 of the floor panel 12, and is linearly connected to the side bead 34 at the slope section 32, the frontal crash load applied to the floor frame 28 can be efficiently transmitted to the rear part of the vehicle body via the side bead 34.

The second middle cross member 36 provided adjacent to the slope section 32 reinforces the slope section 32 so that the transmission of the frontal crash load from the floor frame 28 to the side bead 34 can be effected in a favorable manner. Furthermore, as the rear end of the floor frame 28 complementarily overlaps with the outer periphery of the front end of the side bead 34, an adequate mechanical strength is ensured to the junction between the two parts, and this also contributes to the favorable transmission of the frontal crash load.

As the side bead 34 defines a groove facing or opening out to the passenger compartment, it can be conveniently used for receiving wire harnesses 40 which may include power lines and signals lines as shown in FIGS. 2 and 5. By suitably selecting the dimensions of the side bead 34 and wire harnesses, a flat floor surface may be created with the aid of the carpet 44 as shown in FIG. 5.

The floor frame 28 was connected to the front side frame 20 via the connecting member 22 in the illustrated embodiment, but the present invention is not limited by this embodiment. For instance, the floor frame 28 may be directly connected to the front side frame 20, or the connecting member 22 may consist of an integral extension of the floor frame 28 without departing from the spirit of the present invention.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent applications on which the Paris Convention priority claim is made for the present application as well as any prior art references or copending applications mentioned in this application are incorporated in this application by reference.

The invention claimed is:

1. A vehicle body structure, comprising:

a pair of front side frames each extending in a fore and aft direction;

a floor panel having a front end connected to rear ends of the front side frames and extending rearward from the front end thereof in a substantially horizontal direction;

a first middle cross member extending laterally in a rear end of the floor panel;

a pair of floor frames attached to a lower surface of the floor panel, and each provided with a front end connected to a rear end of the corresponding front side frame and a rear end reaching at least to an intermediate part of the floor panel in the fore and aft direction;

a pair of side beads each having a front end connected to a rear end of the corresponding floor frame and extending rearward therefrom in the fore and aft direction to the first middle cross member;

a pair of side sills extending in the fore and aft direction along either side edge of the floor panel;

a center frame extending in the fore and aft direction along a longitudinal center line of the floor panel; and a pair of connecting members each having a front end connected to a rear end of the corresponding front side frame and a pair of bifurcated rear ends connected to a front end of the corresponding side sill and a front end of the corresponding center frame, respectively;

wherein a crotch portion of each connecting member is connected to a front end of the floor frame, and each front side frame and the corresponding floor frame are connected in mutual alignment in the fore and aft direction in plan view via the corresponding connecting member.

2. The vehicle body structure according to claim 1, wherein a rear part of the floor panel is formed with a foot rest recess recessed from a remaining part of the floor panel, a front end of the foot rest recess including a slope section inclining upward toward a front part of the floor panel, and wherein the side bead extends across the foot rest recess in the fore and aft direction, and has a front end connected to a rear end of the corresponding floor frame at the slope section in linear alignment with each other.

3. The vehicle body structure according to claim 2, wherein the rear end of the floor frame is overlaid on an outer periphery of the front end of the corresponding side bead by a certain longitudinal length.

4. The vehicle body structure according to claim 2, further comprising a second middle cross member extending laterally immediately in front of the slope section.

5. The vehicle body structure according to claim 1, wherein each side bead is formed as a groove having an open end facing upward, and a wire harness is received in the groove defined by the side bead.

6. The vehicle body structure according to claim 1, wherein the floor panel is provided with a center tunnel section bulging upward and extending in the fore and aft direction in a laterally central position of the floor panel, and the center frames extend along either side end of the center tunnel section.

7. The vehicle body structure according to claim 6, wherein a part of the floor panel adjoining the center tunnel section includes a sloping section inclining upward toward the center tunnel section and a horizontal terraced section connected to an inboard side of the sloping section, and an outboard side of each center frame comprises a flange overlaid and welded to the terraced section.

8. The vehicle body structure according to claim 1, wherein the floor panel includes a downward bulge having a bottom surface recessed from a general surface of the floor panel, and at least one bead projecting upward from a bottom wall of the downward bulge and having a top surface substantially at a same elevation as the general surface.

9. The vehicle body structure according to claim 8, wherein the side bead extends in the fore and aft direction laterally adjacent to the downward bulge.

10. A vehicle body structure, comprising:

a pair of front side frames each extending in a fore and aft direction;

a floor panel having a front end connected to rear ends of the front side frames and extending rearward from the front end thereof in a substantially horizontal direction;

a first middle cross member extending laterally in a rear end of the floor panel;

a pair of floor frames attached to a lower surface of the floor panel, and each provided with a front end connected to a rear end of the corresponding front side frame and a rear end reaching at least to an intermediate part of the floor panel in the fore and aft direction; and a pair of side beads each having a front end connected to a rear end of the corresponding floor frame and extending rearward therefrom in the fore and aft direction to the first middle cross member;

wherein a rear part of the floor panel is formed with a foot rest recess recessed from a remaining part of the floor panel, a front end of the foot rest recess including a slope section inclining upward toward a front part of the floor panel, and wherein the side bead extends across the foot rest recess in the fore and aft direction, and has a front end connected to a rear end of the corresponding floor frame at the slope section in linear alignment with each other;

the vehicle body structure further comprising a second middle cross member extending laterally immediately in front of the slope section.

11. A vehicle body structure, comprising:

a pair of front side frames each extending in a fore and aft direction;

a floor panel having a front end connected to rear ends of the front side frames and extending rearward from the front end thereof in a substantially horizontal direction;

a first middle cross member extending laterally in a rear end of the floor panel;

a pair of floor frames attached to a lower surface of the floor panel, and each provided with a front end connected to a rear end of the corresponding front side frame and a rear end reaching at least to an intermediate part of the floor panel in the fore and aft direction; and, a pair of side beads each having a front end connected to a rear end of the corresponding floor frame and extending rearward therefrom in the fore and aft direction to the first middle cross member;

wherein each side bead is formed as a groove having an open end facing upward, and a wire harness is received in the groove defined by the side bead.

12. A vehicle body structure, comprising:

a pair of front side frames each extending in a fore and aft direction;

a floor panel having a front end connected to rear ends of the front side frames and extending rearward from the front end thereof in a substantially horizontal direction;

a first middle cross member extending laterally in a rear end of the floor panel;

a pair of floor frames attached to a lower surface of the floor panel, and each provided with a front end connected to a rear end of the corresponding front side frame and a rear end reaching at least to an intermediate part of the floor panel in the fore and aft direction; and a pair of side beads each having a front end connected to a rear end of the corresponding floor frame and extending rearward therefrom in the fore and aft direction to the first middle cross member;

wherein the floor panel includes a downward bulge having a bottom surface recessed from a general surface of the floor panel, and at least one bead projecting upward from a bottom wall of the downward bulge and having a top surface substantially at a same elevation as the general surface.

13. The vehicle body structure according to claim 12, wherein the side bead extends in the fore and aft direction laterally adjacent to the downward bulge.

*14. A vehicle body structure, comprising:*

*a pair of front side frames each extending in a fore and aft direction;*

*a floor panel having a front end connected to rear ends of the front side frames and extending rearward from the front end thereof in a substantially horizontal direction;*

*a first middle cross member extending laterally in a rear end of the floor panel;*

*a pair of floor frames attached to a lower surface of the floor panel, and each provided with a front end con-*

*nected to a rear end of the corresponding front side frame and a rear end reaching at least to an intermediate part of the floor panel in the fore and aft direction; and*

*a pair of side beads each having a front end connected to a rear end of the corresponding floor frame and extending rearward therefrom in the fore and aft direction to the first middle cross member;*

*wherein the floor panel includes a downward bulge having a bottom surface recessed from a general surface of the floor panel, and at least one bead projecting upward from a bottom wall of the downward bulge, and*

*wherein the at least one bead is elongated in the fore and aft direction.*

*15. The vehicle body structure according to claim 14, wherein the downward bulge is elongated in the fore and aft direction.*

*16. The vehicle body structure according to claim 14, wherein the floor panel is provided with a center tunnel section bulging upward and extending in the fore and aft direction in a laterally central position of the floor panel, and wherein the downward bulge is provided on each side of the center tunnel section.*

*17. The vehicle body structure according to claim 16, wherein the pair of front side frames extend in the fore and aft direction on either lateral side of a vehicle, and wherein each downward bulge is positioned between the central tunnel section and the corresponding side bead.*

*18. The vehicle body structure according to claim 14, wherein the at least one bead is configured to prevent sagging of a carpet placed on a part of the floor panel including the downward bulge.*

* * * * *